United States Patent
Lekar

(10) Patent No.: US 11,885,170 B2
(45) Date of Patent: Jan. 30, 2024

(54) PROTECTION DEVICE FOR A WINDOW OPENING OF A MOTOR VEHICLE

(71) Applicant: BOS GmbH & Co. KG, Ostfildern (DE)

(72) Inventor: Jan Lekar, Ostfildern (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 17/731,932

(22) Filed: Apr. 28, 2022

(65) Prior Publication Data

US 2022/0349238 A1 Nov. 3, 2022

(30) Foreign Application Priority Data

Apr. 29, 2021 (DE) .......................... 102021204275.9

(51) Int. Cl.
| | |
|---|---|
| *E05F 11/48* | (2006.01) |
| *E05F 15/689* | (2015.01) |
| *B60J 1/20* | (2006.01) |

(52) U.S. Cl.
CPC ........... *E05F 15/689* (2015.01); *B60J 1/2011* (2013.01); *E05Y 2201/434* (2013.01);
(Continued)

(58) Field of Classification Search
CPC . E05F 15/689; B60J 1/2011; E05Y 2201/434; E05Y 2201/64; E05Y 2201/654;
(Continued)

(56) References Cited

U.S. PATENT DOCUMENTS 2,710,058 A * 6/1955 Gronlund ............... B60J 1/2011
49/63
4,331,359 A * 5/1982 Sheldon .................. F41H 5/226
49/63
(Continued)

FOREIGN PATENT DOCUMENTS

| DE | 102005012208 A1 | 5/2006 |
|---|---|---|
| DE | 102006037594 A1 | 2/2008 |

OTHER PUBLICATIONS

German Office Action issued in corresponding German Application No. 10 2021 204 275.9 dated Nov. 26, 2021 (6 pages).

*Primary Examiner* — Jerry E Redman
(74) *Attorney, Agent, or Firm* — FLYNN THIEL, P.C.

(57) ABSTRACT

A protection device for a window opening of a motor vehicle, with a window pane shiftable between a closed position closing the window opening and an open position opening the window opening, at least one shading structure shiftable between a window shading position and a window unblocking position, and a cable drive system for driven shifting of the window pane and/or of the shading structure and having a drive and a cable strand movable by the drive. A mechanical coupling arrangement which, depending on the position of the window pane, the shading structure and movement of the cable strand, is transferable between a first coupling state, in which the shading structure is coupled to the cable strand for the driven shifting and the window pane is decoupled therefrom, and a second coupling state, in which the shading structure is decoupled from the cable strand and the window pane is coupled to the cable strand for the driven shifting.

14 Claims, 11 Drawing Sheets

(52) U.S. Cl.
CPC ..... *E05Y 2201/64* (2013.01); *E05Y 2201/654* (2013.01); *E05Y 2201/668* (2013.01); *E05Y 2201/684* (2013.01); *E05Y 2800/10* (2013.01); *E05Y 2900/55* (2013.01)

(58) Field of Classification Search
CPC ......... E05Y 2201/668; E05Y 2201/684; E05Y 2800/10; E05Y 2900/55
USPC ............................... 49/352, 61, 63, 348, 349
See application file for complete search history.

(56) References Cited

U.S. PATENT DOCUMENTS

| | | | | |
|---|---|---|---|---|
| 4,773,697 | A * | 9/1988 | Svensson | B60J 3/02 49/63 |
| 5,165,188 | A * | 11/1992 | Tsiros | B60J 3/02 49/63 |
| 6,523,880 | B1 * | 2/2003 | Yako | B60J 1/2011 296/97.1 |
| 6,561,568 | B1 * | 5/2003 | Gray | B60J 1/2094 296/146.2 |
| 6,810,625 | B2 * | 11/2004 | Thomas | B60J 1/17 49/63 |
| 7,537,039 | B2 | 5/2009 | Fischer | |
| 7,717,158 | B2 * | 5/2010 | Lekar | B60J 1/2086 160/310 |
| 7,806,461 | B2 * | 10/2010 | Patterson | B60J 1/2011 49/63 |
| 7,918,490 | B2 * | 4/2011 | Kriese | B60J 1/2086 296/97.4 |
| 9,751,386 | B1 * | 9/2017 | Attig | B60J 1/2011 |
| 10,343,500 | B2 * | 7/2019 | Chander | B60J 1/17 |
| 2003/0025354 | A1 * | 2/2003 | Akintan | B60J 1/17 49/63 |
| 2007/0029055 | A1 * | 2/2007 | Joseph | B60J 1/2011 160/105 |
| 2007/0145775 | A1 * | 6/2007 | Smith | B60J 1/2011 296/146.15 |
| 2007/0200387 | A1 * | 8/2007 | Patterson | B60J 7/003 296/146.16 |
| 2009/0015740 | A1 * | 1/2009 | Sagitov | B60J 3/04 349/16 |
| 2014/0375083 | A1 * | 12/2014 | Tejeda | B60J 7/043 49/404 |

* cited by examiner

PROTECTION DEVICE FOR A WINDOW OPENING OF A MOTOR VEHICLE

CROSS REFERENCE TO RELATED APPLICATION

This claims priority from German Application No. 10 2021 204 275.9, filed Apr. 29, 2021, the disclosure of which is hereby incorporated by reference in its entirety.

TECHNICAL FIELD

The invention relates to a protection device for a window opening of a motor vehicle, having a window pane which can be shifted with linear guidance between a closed position, in which the window pane closes the window opening, and an open position, in which the window opening is opened, at least one shading structure which can be shifted with linear guidance between a shading position, in which the shading structure shades the window opening, and an unblocking position, in which the shading structure unblocks the window opening, and having a cable drive system which is configured for drivingly shifting the window pane and/or of the shading structure and has a drive and a cable strand which is movable by means of the drive and is laid along a laying path.

BACKGROUND AND SUMMARY

A protection device of this type is known from DE 10 2006 037 594 A1 and is provided for a side window opening of a passenger vehicle. The known protection device has a movable window pane for opening and closing the side window opening. In addition, the known protection device has a shading structure in the form of a roller blind web held on a winding shaft so as to be able to be wound up and unwound. In a shading position unwound from the winding shaft, the roller blind web shades the side window opening. In an unblocking position rolled up on the winding shaft, the roller blind web unblocks the side window opening. Furthermore, the known protection device has a cable drive system with a drive and with a cable strand which is movable by means of the drive. The cable drive system forms a window opener for shifting the window pane and therefore for opening and closing the side window opening. In the case of the known protection device, basically manual shifting of the roller blind web between the shading position and the unblocking position is provided. In addition, a semi-automatic shifting from the shading position into the unblocking position is possible. This semi-automatic shifting of the roller blind web takes place via a drive member which is connected to the drive of the cable drive system and which is formed separately from the cable strand and is configured in the manner of a Bowden cable.

In view of the above, a protection device of the type mentioned at the beginning is provided which has a simple construction and permits a simple and reliable driving movement of the window pane and of the shading structure.

This is achieved in that a mechanical coupling arrangement is provided which, depending on the position of the window pane, the position of the shading structure and the movement of the cable strand, can be transferred between a first coupling state, in which the shading structure is coupled to the cable strand and is driven in a shifting movement by the cable strand and the window pane is decoupled from the cable strand, and a second coupling state, in which the shading structure is decoupled from the cable strand and the window pane is coupled to the cable strand and is driven in a shifting movement by the cable strand. By means of the solution according to the invention, a "fully automatically" driven movement of the shading structure between the shading position and the unblocking position can be achieved, and at the same time as simple a construction as possible of the cable drive system can be achieved or at any rate maintained. For the fully automatically driven movement of the shading structure, in particular a further drive, a further cable strand or the like are not required. Instead, the cable drive system serves as a common drive of the window pane and of the shading structure, wherein, in given time periods, the window pane and, in given time periods, the shading structure are coupled to the cable strand and/or are each decoupled therefrom in given time periods. In other words, the window pane and the shading structure are alternately releasably connected to the cable strand and released from the latter. For this purpose, there is the mechanical coupling arrangement. The mechanical coupling arrangement can be transferred between the first coupling state and the second coupling state. In the first coupling state, the cable drive system drives, preferably exclusively, the window pane. In the second coupling state, the cable drive system drives, preferably exclusively, the shading structure. The mechanical coupling arrangement is preferably configured for the releasably force- and/or form-fitting coupling of the window pane and the shading structure in each case to the cable strand. The transfer between the first and the second coupling state can also be understood as meaning a switching operation or coupling operation. The transfer of the mechanical coupling arrangement between the first and second coupling state takes place depending on whether the window pane takes its closed or open position, the shading structure takes up its shading or unblocking position and depending on the movement, in particular the direction of movement, of the cable strand. The transfer takes place automatically and/or in a mechanically controlled manner. The cable strand is movable by means of the drive, wherein the movement is preferably possible in a first driving direction and in an opposite second driving direction in each case along the laying path. Preferably, a movement along the first driving direction brings about closing and/or shading of the window opening and a movement in the opposite second driving direction brings about unblocking and/or opening of the window opening. For the linear guidance of the window pane and/or of the shading structure, a guide rail arrangement is preferably present. The linear guidance of the window pane and of the shading structure preferably takes place along parallel guiding directions. The shading structure is preferably configured as a flexible sheet-like structure, for example as a roller blind web or venetian blind, or as a dimensionally stable light screen. Furthermore preferably, the coupling arrangement is configured in such a manner that the first coupling state is taken up when the shading structure is shifted between its shading position and unblocking position and is removed during a movement of the cable strand going beyond the unblocking position in order to shift the window pane into the open position, and that the second coupling state is taken up during shifting of the window pane between its open and closed position and is removed during a movement of the cable strand going beyond the closed position in order to shift the shading structure into the shading position.

In a refinement, the coupling arrangement has a first coupling device connected to the shading structure and a second coupling device connected to the window pane, said coupling devices each being guided linearly on a guide rail arrangement, wherein, in the respective coupling state, the first and the second coupling device interact in a force- and movement-transmitting, releasably form-fitting manner with at least one driver element which is connected to the cable strand. As such, a particularly simple and robust construction of the mechanical coupling arrangement is achieved. The connection of the first coupling device to the shading structure is independent of the respective coupling state. The same analogously applies in respect of the connection between the second coupling device and the window pane and the connection between the at least one driver element and the cable strand. In the first coupling state, the at least one driver element interacts with the first coupling device for force and movement transmission. In the second coupling state, the at least one driver element accordingly interacts with the second coupling device. The at least one driver element can interact to this extent alternately with the first or the second coupling device. Preferably, a further driver element is connected to the cable strand, and therefore a first and a second driver element can be referred to. In this case, the first driver element can be assigned to the first coupling device and the second driver element to the second coupling device. In such a configuration, it can be provided that, when transferring from the first coupling state into the second coupling state, the first driver element is disengaged from the first coupling device and the second driver element enters into engagement with the second coupling device. The same applies analogously in reverse when transferring from the second coupling state into the first coupling state.

In a further refinement, the laying path of the cable strand has at least one first bend formed by means of a first deflecting pulley and a second bend formed by means of a second deflecting pulley, wherein the coupling and decoupling of the first coupling device take place in the region of the first bend, and wherein the coupling and decoupling of the second coupling device take place in the region of the second bend. In the region of the respective bend, the laying path of the cable strand has a directional deflection of greater than 90°, preferably between 130° and 180°, particularly preferably of 180°. If, because of the driving movement of the cable strand, the driver element moves in the region of one of the two bends, a corresponding directional deflection is undertaken. This directional reversal or deflection permits a particularly simple and robust coupling and decoupling of the respective coupling device.

In a further refinement, the first coupling device and/or the second coupling device each have a slide unit which is guided linearly on the guide rail arrangement and has a driver profiling which is configured for the releasably form-fitting interaction with the at least one driver element. The slide unit is preferably guided linearly in a sliding manner on the guide rail arrangement. In a state mounted ready for operation, the guide rail arrangement is preferably integrated in a door module of the motor vehicle and arranged below a sill of the window opening. If the two coupling devices have a slide unit, a first slide unit and a second slide unit can also be referred to. The guide rail arrangement is preferably elongate in the vertical direction of the vehicle and/or in the vertical direction of the window opening. In the coupled state, the driver profiling interacts with the at least one driver element. The driver profiling is preferably configured as a slot, groove, web or the like. Furthermore, preferably, the guide rail arrangement has a first guide rail assigned to the first coupling device and a second guide rail assigned to the second coupling device. The first and second guide rails are preferably elongate parallel to each other. Furthermore preferably, the closing, opening, shading and unblocking position correspond to different end positions of the respective coupling device and/or slide unit in the region of a lower and/or upper front end of the respective guide rail. In a further refinement of the invention, the driver profiling is configured as a driver slot which is open on one side and into which the at least one driver element enters for the coupling, and is held in a form-fitting manner, and from which the driver element emerges for the decoupling. This firstly ensures simple and robust coupling and decoupling. At the same time, an inadvertent decoupling is counteracted. If the coupling and decoupling according to one of the previous refinements take place in the region of a bend of the laying path, the driver slot, which is open on one side, is preferably elongate parallel to the bend at least in sections. In other words, the driver slot in this case is preferably longitudinally curved, angled, bent or the like at least in sections. The driver slot is open on one side and to this extent has an inlet opening in which the at least one driver element enters for coupling in the driver slot. For the decoupling, the driver element leaves the driver slot through the inlet opening.

In a further refinement, the first coupling device and/or the second coupling device each have a locking unit, by means of which the respective coupling device is releasably lockable in a form- and/or force-fitting manner to the guide rail arrangement by controlling action of the driver element. The locking unit counteracts an inadvertent shifting of the first coupling device and therefore the shading structure and/or the second coupling device and therefore the window pane. If both coupling devices have a locking unit each, a first locking unit and a second locking unit may also be mentioned. In this refinement, the at least one driver element has a particularly advantageous multiple function. Firstly, the at least one driver element serves for the alternate coupling and/or carrying along of the window pane and of the shading structure. Secondly, the at least one driver element serves simultaneously as a control element in order to transfer the locking unit between a locking state and a release state. In the locking state, the respective coupling device is locked to the guide rail arrangement by means of the respective locking unit and is therefore immovable. In the release state, the locking unit releases the movability of the respective coupling device along the guide rail arrangement. The at least one driver element preferably controls the locking in such a manner that the window pane is releasably lockable in the closed and/or open position, and that the shading structure is releasably lockable in its shading and/or unblocking position.

In a further refinement, the locking unit has a locking element which can be shifted between a locking state and a release state and has a control profiling with which the at least one driver element interacts for shifting the locking element between the locking state and the release state. The locking element interacts with the guide rail arrangement for the purpose of locking. The locking element is preferably shiftable linearly, pivotably and/or rotatably between the locking state and the release state. The shifting movement preferably takes place here relative to the respective coupling device, in particular the slide unit thereof, if such a slide unit is present. For the interaction with the at least one driver element, the locking element has the control profiling which can be configured in particular as a slot, groove, web or the like.

In a further refinement, the locking element is a rotary wheel which is mounted, in particular on the respective slide unit, so as to be rotatable about an axis of rotation and has a locking profiling which, for the locking, interacts in a releasably form-fitting manner with a front end of the guide rail arrangement. The axis of rotation is preferably oriented perpendicular to a guiding direction of the respective coupling device, the guiding direction extending along the guide rail arrangement. The rotary wheel is shiftable rotatably relative to the remaining components and/or portions of the respective coupling device, in particular the slide unit thereof. For the purpose of form-fitting locking, the locking profiling of the rotary wheel interacts with the front end of the guide rail arrangement. The locking profiling is preferably formed on a radially outer edge region of the rotary wheel. The locking profiling can be configured in particular as a groove, slot, web or the like. The front end of the guide rail arrangement preferably has a profiling which is complementary to the locking profiling.

In a further refinement, the control profiling is configured as a control slot which is open on one side, on the locking element, and/or the control profiling and the driver profiling are arranged overlapping one another at least in sections forming a slotted guide arrangement for controlling the movement of the locking element. In order to control the shifting movement of the locking element between the locking state and the release state, the at least one driver element enters into the control slot, which is open on one side. In other words, the control slot, which is open on one side, preferably acts as a slotted control guide for controlling the locking unit. The slotted guide arrangement formed by the at least partially overlapping arrangement of the control profiling and the driver profiling permits in particular an improved and particularly precise control of the locking unit between the locking state and the release state.

In a further refinement, at least one further shading structure is present and is connected to a further cable strand of the cable drive system, wherein the further shading structure is assigned to a secondary portion of the window opening, and wherein the further cable strand is connected to the first coupling device, as a result of which a towed force movement of the further shading structure depending on the shifting movement of the shading structure is achieved. In this refinement of the invention, the shading structure can also be referred to as main shading structure and the further shading structure as secondary shading structure. The further shading structure serves for shading a secondary portion of the window opening, for example a portion, which is triangular in the widest sense, in the region of a C pillar of the motor vehicle. In contrast to the cable strand, the further cable strand cannot be driven directly by the drive. Instead, the further cable strand is connected to the first coupling device for the towed forced movement. By means of this refinement of the invention, a shading of the window opening over as full a surface area as possible and at the same time a "fully automatic" drive constructed as simply as possible of the two shading structures required for this purpose can be achieved. The further shading structure can be shifted with linear guidance between a shading position, in which the shading structure shades the secondary portion of the window opening, and an unblocking position, in which the further shading structure unblocks the secondary portion of the window opening. The secondary shading structure is preferably guided linearly on the guide rail arrangement. The guide rail arrangement preferably has a guide rail which is assigned to the further shading structure and which is elongate along a further guiding direction. The further guiding direction of the secondary shading structure is preferably oriented obliquely with respect to a guiding direction assigned to the main shading structure.

In a further refinement, the shading structure is a dimensionally stable light screen which is comparatively less light-permeable than the window pane and/or is at least predominantly, particularly preferably completely, light-impermeable. The inventors have recognized that the refinement of the shading structure in the form of a dimensionally stable light screen is associated with numerous advantages. Advantages which can be mentioned include in particular improved protection in relation to damage and a structurally simple adaptability to a contour of the window opening to be shaded. This is in particular in comparison to shading structures in the form of a flexible sheet-like structure, such as, for example, a roller blind web. The dimensionally stable light screen preferably has an outer contour which at least substantially corresponds to an outer contour of the window pane. The dimensionally stable light screen can be manufactured from a glass material or plastics material having light-impermeable properties coordinated in each case with a sought shading and/or darkening.

A coupling arrangement for a protection device according to the preceding description is also provided, having at least one coupling device with a slide unit which is configured for the slidable linear guidance on a guide rail arrangement and has a driver profiling for the releasably form-fitting interaction with a driver element of a cable drive system, and/or with a locking unit, by means of which the coupling device is lockable in a releasably form-fitting and/or force-fitting manner to the guide rail arrangement by controlling action of the driver element. Features of the mechanical coupling arrangement of the protection device according to the invention and refinements thereof can be features of the coupling arrangement according to the invention and/or vice versa. In respect of the advantages associated with the coupling arrangement according to the invention, reference is made to the preceding description in order to avoid repetitions.

The invention also relates to a motor vehicle door with a protection device according to the preceding description. The protection device is preferably arranged under a sill of a window opening of the motor vehicle door. The motor vehicle door preferably has an interior lining facing the interior of the motor vehicle and a door outer skin which faces exteriorly and forms a portion of the body of the motor vehicle. The protection device is mounted in a construction space formed between the door outer skin and the interior lining.

Further advantages and features of the invention emerge from the claims and from the description below of preferred exemplary embodiments of the invention that are illustrated with reference to the drawings.

DETAILED DESCRIPTION

Figure 1:
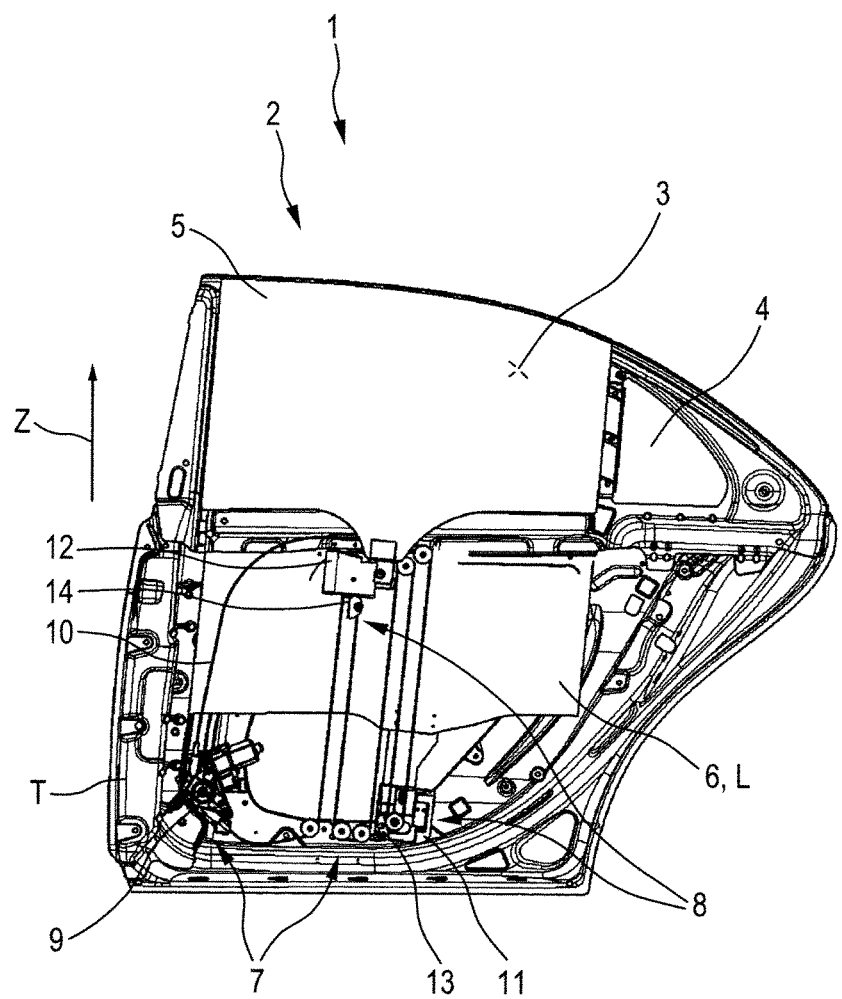
FIG. 1 shows a schematic illustration of an embodiment of a motor vehicle door according to the invention for a passenger vehicle, the motor vehicle door being provided with an embodiment of a protection device according to the invention.

According to FIG. 1, a motor vehicle door 1 in the form of a rear side door is provided for a passenger vehicle, not shown specifically, and is equipped with a protection device 2. The protection device 2 can be seen in detail with reference to FIGS. 2 to 9 and is assigned to a window opening 3, 4 of the motor vehicle door 1. In the embodiment shown, the window opening 3, 4 has a main opening 3 and a secondary opening 4. The motor vehicle door 1 has a supporting structure T which forms part of the body of the passenger vehicle. The supporting structure T has a configuration and function basically known to a person skilled in the art, and therefore more specific explanations in this regard are dispensed with.

The protection device 2 has a window pane 5, a shading structure 6, a cable drive system 7 and a mechanical coupling arrangement 8.

The window pane 5 can also be referred to as a side window, more precisely: a rear side window, and is driven by means of the cable drive system 7 so as to shift between a closed position and an open position. In the closed position, the window pane 5 closes the window opening 3, 4, more precisely: the main opening 3 of the window opening 3, 4. In the open position, the window pane 5 opens up the window opening 3, 4 in the region of the main opening 3. The secondary opening 4, which can also be referred to as a triangular window, is conventionally closed by fixed glazing which is not illustrated specifically and which cannot be opened. The closed position is shown with reference to FIGS. 1, 2 and 4. In the open position, the window pane 5 is lowered along a vehicle vertical direction Z in a basically known manner such that an upper edge, not denoted specifically, of the window pane 5 is arranged approximately in the region of a sill of the window opening 3, 4. The open position is not illustrated specifically here in the drawing. Furthermore, the window pane 5 is manufactured from a transparent glass material or plastics material in a manner known to a person skilled in the art.

The shading structure 6 is driven between a shading position and an unblocking position by means of the cable drive system 7, which cable drive system 7 causes a shifting movement of the shading structure 6 between these positions. In the unblocking position, the shading structure 6 unblocks or does not obstruct the window opening 3, 4, which is closed by the window pane 5, in the region of its main opening 3. The unblocking position is shown here in the drawing with reference to FIGS. 1, 2 and 4. In the unblocking position, the shading structure 6 is arranged along the vehicle vertical direction Z below the sill of the window opening 3, 4. In the shading position, the window opening 3, 4, which is closed by the window pane 5, is shaded in the region of its main opening 3 by means of the shading structure 6. In the shading position, the shading structure 6 is shifted upward along the vehicle vertical direction Z and is positioned so as to approximately cover the surface of the window pane 5. The shading position is not shown specifically here in the drawing.

In the embodiment which is shown, the shading structure 6 is a dimensionally stable light screen L. The dimensionally stable light screen L is comparatively less light-permeable than the window pane 5. In the present case, the light screen L is at least predominantly, particularly preferably completely, light-impermeable. As such, a shading which is as substantial as possible or even darkening of the interior of the passenger vehicle can be achieved. The dimensionally stable light screen L can be manufactured, for example, from a tinted glass material or plastics material. In the embodiment which is shown, an outer contour, not denoted specifically, of the light screen L corresponds at least substantially to an outer contour, not denoted specifically, of the window pane 5, which, in turn, is adapted to an inner contour, not denoted specifically, of the main opening 3 of the window opening 3, 4.

Figure 2:
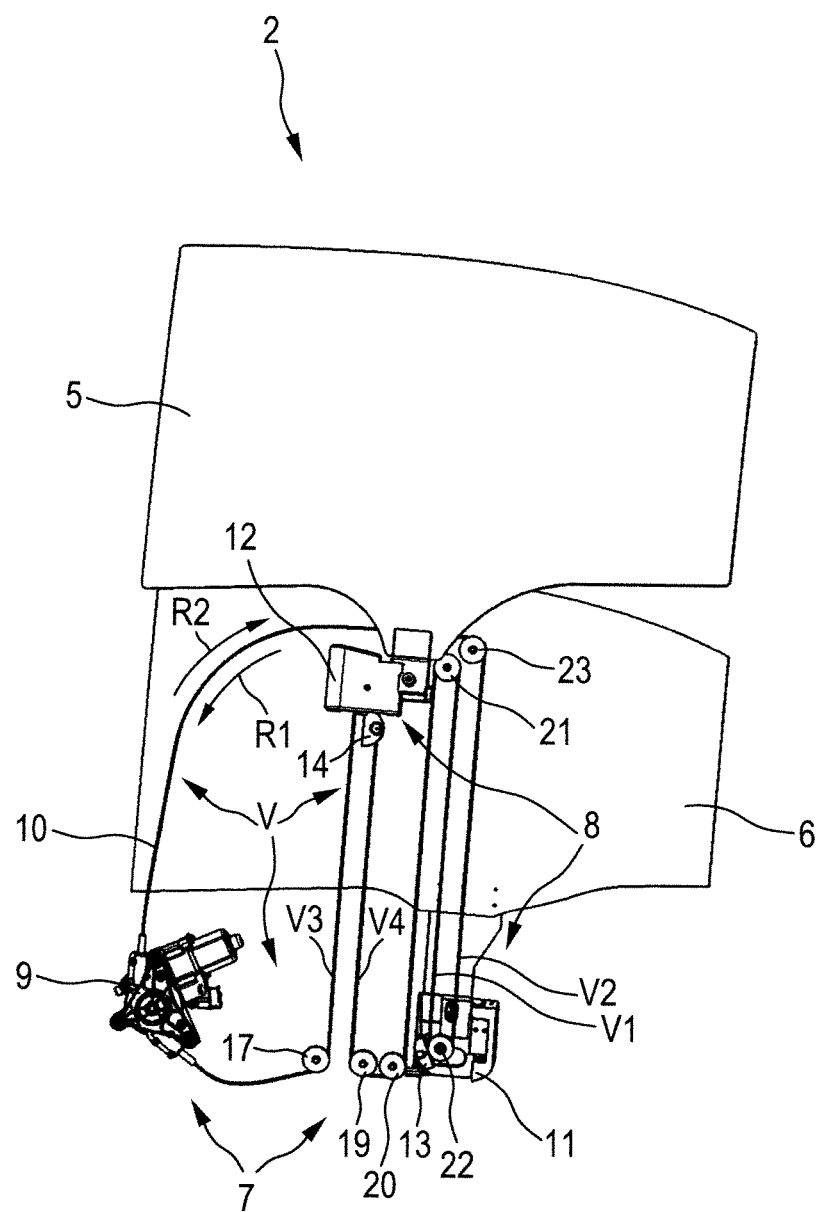
FIG. 2 shows a schematic outer view of the protection device according to FIG. 1.
Figure 3:
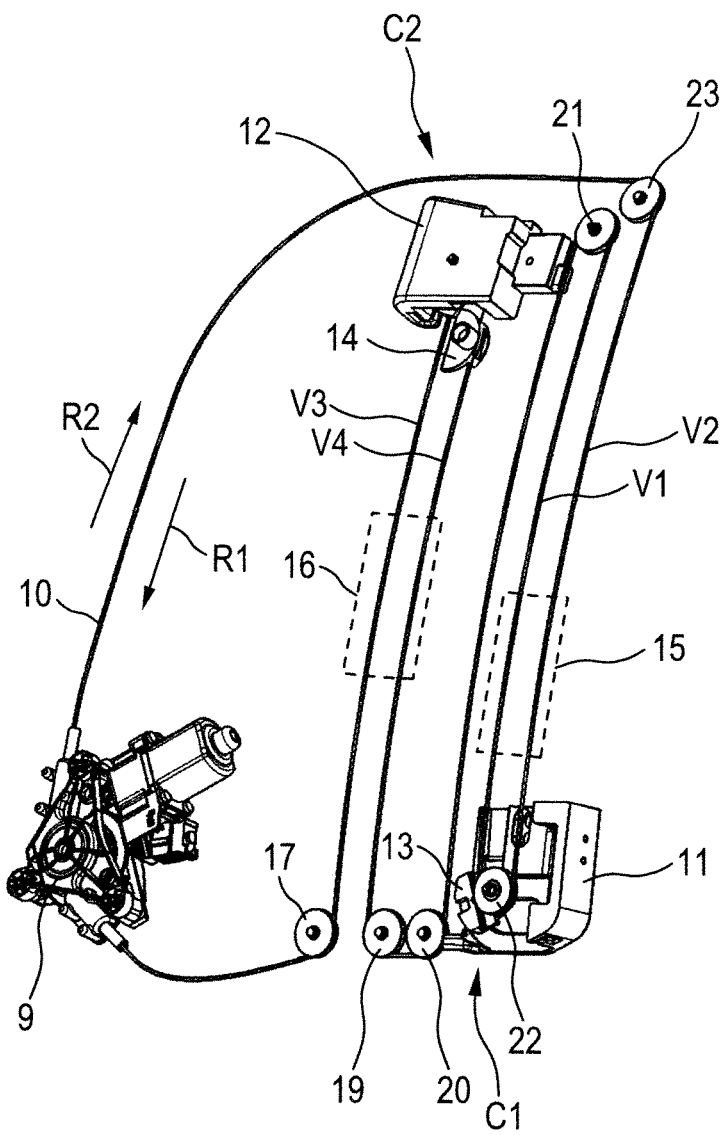
FIG. 3 shows a perspective outer view of the protection device according to FIGS. 1 and 2 with a window pane, a shading structure being omitted from the drawing, and with a guide rail arrangement of the protection device being indicated in the drawing.
Figure 4:
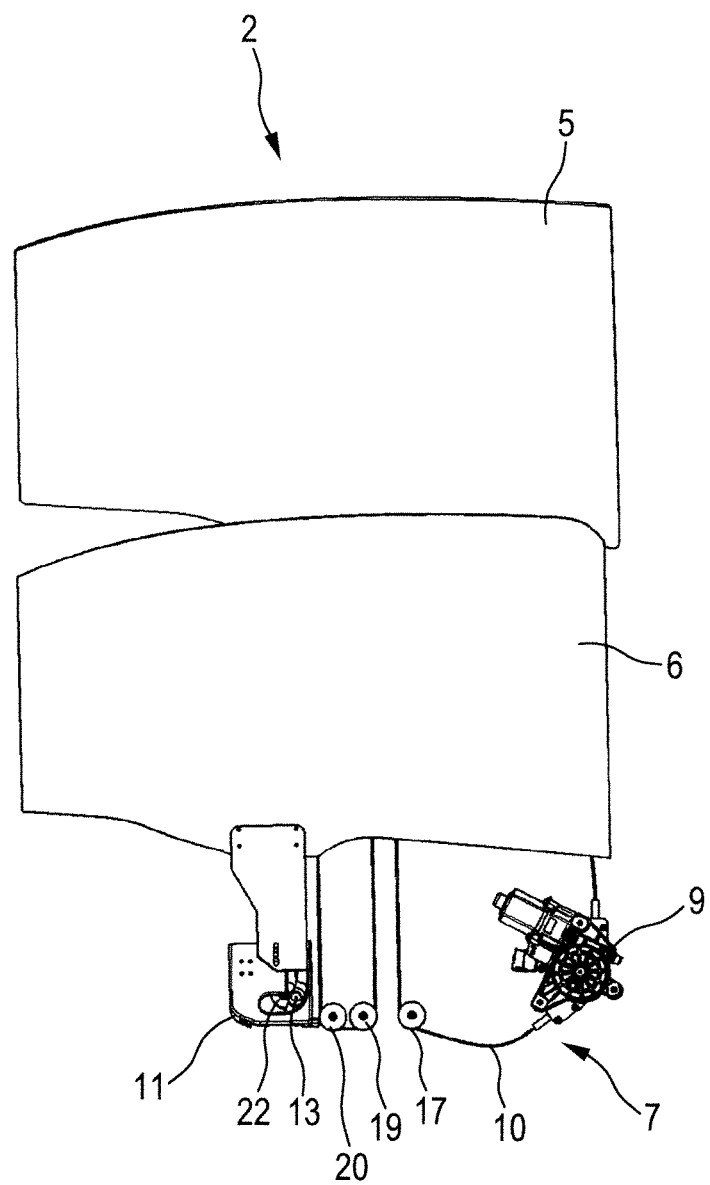
FIG. 4 shows a schematic inner view of the protection device according to FIGS. 1 to 3.
Figure 5:
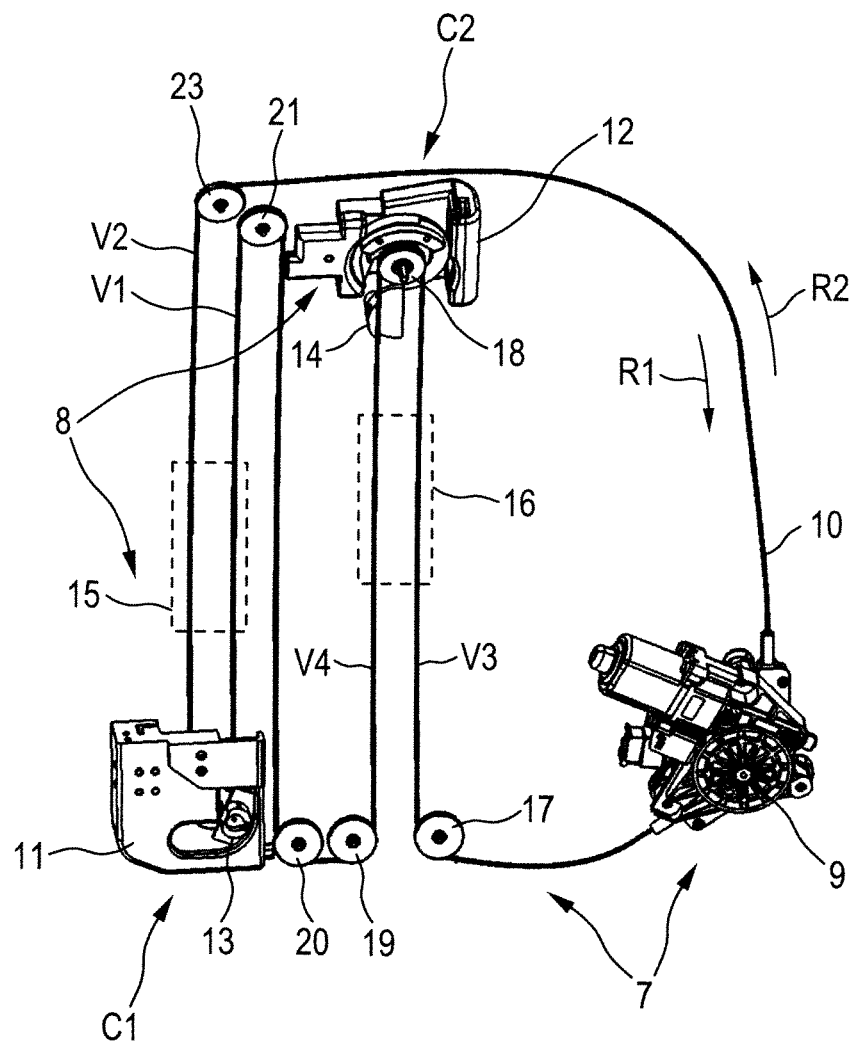
FIG. 5 shows a perspective inner view of the protection device according to FIGS. 1 to 4 with the window pane and the shading structure being omitted from the drawing and with the guide rail arrangement being indicated in the drawing.

The cable drive system 7 serves to drive and thus shift the window pane 5 and the shading structure 6 between the above-described positions and has a drive 9 and at least one cable strand 10. The drive 9 and the cable strand 10 are configured in a manner known to a person skilled in the art. The drive 9 has to this extent an electric motor unit, not denoted specifically, and a transmission unit, by means of which the motor unit acts in a force- and movement-transmitting manner on the cable strand 10. In the embodiment which is shown, the cable strand 10 is configured as a revolving cable strand and enters at one end in the drive 9 and emerges at the other end from the latter. The cable strand 10 is laid here along a laying path V inside the motor vehicle door 1 and below the sill of the window opening 3, 4. In addition, the cable strand 10 is preloaded in tension in a manner which is not shown specifically, but is known to a person skilled in the art. The laying path V is formed here by means of deflecting pulleys, not denoted specifically either, and a sheath which is stiff in tension and compression and which encases the cable strand at least in sections. The cable strand 10 is movable along the laying path V by means of the drive 9 and can be moved either in a clockwise direction or anticlockwise direction along the laying path V by appropriate activation of the drive 9. To this extent, a first movement direction R1 (anticlockwise) and a second movement direction R2 (clockwise) may also be mentioned (FIG. 2).

The coupling arrangement 8 serves for alternate force- and movement-transmitting coupling of the cable drive system 7 to the window pane 5 and to the shading structure 6. By means of this alternate coupling, separate cable drive systems for the window pane 5, on the one hand, and the shading structure 6, on the other hand, can be dispensed with. Expressed in other words, the cable drive system 7 according to the invention acts on the one hand as a window opener and on the other hand as a drive for the shading structure 6. In order to permit a functionally correct shifting of the window pane 5 and of the shading structure 6 with one and the same drive, the mechanical coupling arrangement can be transferred between a first coupling state and a second coupling state. In the first coupling state, the shading structure 6 is coupled to the cable strand 10 and is driven by the cable strand 10 in a shifting movement, and the window pane 5 is decoupled from the cable strand 10. In the second coupling state, the shading structure 6 is decoupled from the cable strand 10 and the window pane 5 is coupled to the cable strand 10 and is driven by the cable strand 10 in a shifting movement. This coupling and decoupling takes place in a mechanically controlled manner depending on the position of the window pane 5, the position of the shading structure 6 and the movement of the cable strand 10.

In the embodiment which is shown, the mechanical coupling arrangement 8 is configured in such a manner that the first coupling state is taken up when the shading structure 6 is shifted between its shading position and unblocking position. During a movement of the cable strand 10 going beyond the unblocking position, the coupling of the cable strand 10 to the shading structure 6 is removed. A further shifting of the cable strand 10 then does not bring about any further shifting of the shading structure 6. Furthermore, the mechanical coupling arrangement 8 is configured here in such a manner that the second coupling state is taken up during shifting of the window pane 5 between its open position and closed position. During a movement of the cable strand going beyond the closed position, the second coupling state is removed, and therefore a further movement of the cable strand 10 does not bring about any further movement of the window pane 5.

In the embodiment which is shown, a driven movement of the cable strand 10 along the first movement direction R1 brings about a raising of the window pane 5 and/or a raising of the shading structure 6 in order to close or shade the window opening 3, 4. Conversely, a shifting along the second movement direction R2 brings about a lowering of the window pane 5 and/or the shading structure 6 in order to open or unblock the window opening 3, 4.

In the embodiment which is shown, the mechanical coupling arrangement 8 has a first coupling device 11 connected to the shading structure 6 and a second coupling device 12 connected to the window pane 5. In addition, at least one driver element 13, 14 connected to the cable strand 10 is provided. The at least one driver element 13, 14 is assigned to the mechanical coupling arrangement 8 and/or to the cable drive system 7. During a movement of the cable strand 10 along the laying path V, the at least one driver element 13, 14 moves together with said cable strand 10 and in this way interacts in a releasably form-fitting manner with the first coupling device 11 and/or the second coupling device 12 for the purpose of transmitting force and movement.

In the embodiment which is shown, there are two driver elements 13, 14 which may also be referred to as first driver element 13 and second driver element 14. Such a configuration with two driver elements is advantageous, but not essential. In an embodiment which is not illustrated in the drawing, there is accordingly just one single driver element.

The first coupling device 11 is arranged below a lower edge of the shading structure 6 with respect to the vehicle vertical direction Z and is joined with (by means of joining connections suitable for this purpose) the shading structure 6 or with a component connected fixedly to the shading structure 6. The same applies analogously in respect of the connection of the second coupling device 12 to the window pane 5. The driver elements 13, 14 are fixedly connected to the cable strand 10 in a manner known to a person skilled in the art.

The shifting of the window pane 5 and of the shading structure 6 between said positions takes place with linear guidance. In order to achieve, or at any rate to assist, in meeting linear guidance requirements, the first coupling device 11 and the second coupling device 12 are guided linearly here on a guide rail arrangement 15, 16 which is indicated schematically with reference to FIGS. 3 and 5. In addition, a linear guide device which is formed in the region of the supporting structure T and is configured for guiding the window pane 5 and/or the shading structure 6 can be present.

In the embodiment which is shown, the guide rail arrangement 15, 16 has a first guide rail 15, which is assigned to the first coupling device 11, and a second guide rail 16, which is assigned to the second coupling device 12. The first and second guide rails 15, 16 extend in their respective main direction of extent along the vehicle vertical direction Z and are parallel to one another. The guide rail arrangement 15, 16 is fastened to the supporting structure T below the sill of the window opening 3, 4 in a manner not apparent specifically.

In the unblocking position of the shading structure 6, the first coupling device 11 takes up a lower end position—with respect to the longitudinal extent of the first guide rail 15. In the shading position, the first coupling device 11 takes up an upper end position. In the closed position of the window pane 5, the second coupling device 12 takes up an upper end position—with respect to the longitudinal extent of the second guide rail 16. In the open position, the second coupling device 12 takes up a lower end position. The coupling and decoupling by means of the mechanical coupling device 8 take place here in such a manner that the second coupling device 12 remains in its upper end position even if the first coupling device 11 is shifted between its lower and upper end position. Conversely, the first coupling device 11 can then be shifted between its lower and upper end position only when the second coupling device 12 takes up its upper end position and the window opening 3, 4 is closed. As such, in particular, damage to the shading structure 6 by the headwind of the passenger vehicle can be counteracted. In other words, the mechanical control of the coupling arrangement 8 is configured in such a manner that the window opening 3, 4 can be shaded only in the closed state of the window pane 5.

In the embodiment which is shown, the direction of the laying path V is deflected repeatedly by means of a plurality of deflecting pulleys 17 to 23. In the following, the deflecting pulley 22 is referred to as a first deflecting pulley and the deflecting pulley 18 as a second deflecting pulley.

The first deflecting pulley 22 is arranged on the front end side of the first guide rail 15 in the region of the lower end position of the first coupling device 11. The laying path V has a first bend C1 formed by means of the first deflecting pulley 22. In the region of the bend C1, the laying path V is angled here by 180°. The laying path V is subdivided by the first deflecting pulley 22 into a first path portion V1 and a second path portion V2. The path portions V1, V2 are elongate anti-parallel. In the embodiment which is shown, the coupling and decoupling of the first coupling device 11 to and from the cable strand 10 take place in the region of the first bend C1, more precisely: whenever the first driver element 13 and the first coupling device 11 are positioned in the region of the first bend C1.

In the region of the second deflecting pulley 18, the laying path V forms a second bend C2. The cable strand 10 is deflected by 180° here in the region of the second bend C2. The bend C2 and/or the second deflecting pulley 18 subdivide the laying path V into a third path portion V3 and a fourth path portion V4. The third and fourth path portion V3, V4 are elongate anti-parallel. In the embodiment which is shown, the coupling and decoupling of the second coupling device 12 take place in the region of the second bend C2, more precisely: whenever the second coupling device 12 and the second driver element 14 are positioned in the region of the second bend C2.

Before further details of the functioning and configuration of the first and second coupling device 11, 12 are discussed, the basic functioning of the mechanical coupling arrangement 8 will first of all be described on the basis of the configuration shown in particular in FIGS. 1 to 5.

In the configuration which is shown, the different components and/or portions of the protection device 2 take up the following positions: window pane 5 in closed position; second coupling device 12 in upper end position; second driver element 14 in the region of the fourth path portion V4; shading structure 6 in unblocking position; first coupling device 11 in lower end position; first driver element 13 in the region of the first path portion V1. In addition, in this configuration, there is no force- and movement-transmitting operative connection between the second driver element 14 and the second coupling device 12. The same is true in respect of the first driver element 13 and the first coupling device 11. As a result, in the configuration which is shown, the mechanical coupling arrangement 8 takes up a type of transition position in which both the window pane 5 and the shading structure 6 are decoupled from the cable strand 10.

Proceeding from said configuration, the cable strand 10 is shifted along the first movement direction R1 by means of the drive 9. The second driver element 14 is thereby shifted downward along the fourth path portion V4. There is no interaction whatsoever here with the second coupling device 12. The latter remains in its upper end position. The first driver element 13 passes through the first bend C1 and, in the process, enters into a force- and movement-transmitting operative connection with the first coupling device 11. During further movement of the cable strand 10 in the first movement direction R1, the first coupling device 11 is shifted upwards along the guide rail arrangement 15, 16 from its lower end position. In other words, the first coupling device 11 is towed upwards together with the shading structure 6 by means of the first driver element 13. The first driver element 13 moves here upwards along the second path portion V2. The shading structure 6 can thereby be shifted into its shading position. In order to remove the shading, the cable strand 10 is shifted along the second movement direction R2. As such, the first driver element 13 together with the first coupling device 11 coupled thereto and the shading structure 6 is shifted downwards along the second path portion V2 or the guide rail arrangement 15, 16. After reaching the lower end position (FIG. 2) of the first coupling device 11, the first driver element 13 passes through the first bend C1. After passing through the first bend C1, the form- and/or force-fitting operative connection between the first driver element 13 and the first coupling device 11 is removed, and the shading structure 6 is decoupled from the cable strand 10. The shading structure 6 remains in the unblocking position even during further shifting of the cable stand 10 along the second movement direction R2. Proceeding from the configuration shown with reference to the figures, the second driver element 14 then enters the region of the second bend C2 and therefore into form- and/or force-fitting engagement with the second coupling device 12. As such, the window pane 5 is coupled to the cable strand 10. After passing through the second bend C2, the second driver element 14 moves downwards along the third path portion V3. The second coupling device 12 is towed downwards here along the guide rail arrangement 15, 16 in the direction of its lower end position together with the window pane 5. In this way, the window pane 5 is shifted into its open position. By means of a renewed reversal of direction of the movement of the cable strand 10, the window pane 5 can be shifted into its closed position. A shifting of the cable strand 10 going beyond the closed position causes the second coupling device 12 to be disengaged from the second driver element 14. At the same time, the first driver element enters into engagement with the first coupling device 11 such that the shading structure 6—with the window opening 3, 4 now closed—can be shifted into its shading position.

The more precise configuration and functioning of the coupling devices 11 and 12 will be explained below with reference to FIGS. 6 to 9. This will be undertaken primarily with respect to the second coupling device 12. What is stated regarding the second coupling device 12 accordingly applies analogously to the first coupling device 11. To this extent, the construction thereof is not explained in detail. Instead, reference is expressly made to that stated with regard to the second coupling device 12.

The second coupling device 12 has a slide unit 24 which is guided linearly on the guide rail arrangement 15, 16, more precisely: on the second guide rail 16, and which has a driver profiling 25. The driver profiling 25 is configured for the releasable form-fitting interaction with the second driver element 14. In addition, the second coupling device 12 has a locking unit 26, by means of which the second coupling device 12 is releasably lockable in a form- and/or force-fitting manner to the second guide rail 16 by controlling action of the second driver element 14.

In the embodiment which is shown, the slide unit 24 has a slide body 241 which interacts in a sliding manner directly with the second guide rail 16. For this purpose, the slide body 241 has guide slots 242 which are arranged opposite one another in the transverse direction of the slide body 241, are open inward and are elongate parallel to the direction of longitudinal extent of the second guide rail 16. In the ready for operation mounted state, the slide body 241 sits on or at the second guide rail 16, with lateral guide webs 161 of the second guide rail 16 engaging in the guide slots 242. Of course, a configuration with just one guide slot is also conceivable. The second coupling device 12 is held in this way so as to be slidable along the second guide rail 16 and in a form-fitting manner thereon in the other directions.

In the embodiment which is shown, the driver profiling 25 is formed directly on the slide body 241. In addition, the driver profiling 25 is configured as a driver slot S1, which is open on one side. For the coupling of the second coupling device 12, the second driver element 14 enters at one end in the driver slot S1. For the decoupling, the second driver element 14 emerges from the driver slot S1. The driver slot S1 has an inlet portion 251, a longitudinal portion 252 and a transverse portion 253. In the embodiment which is shown, the second driver element 14 has a driver extension 141 which is formed cylindrically. The driver slot S1 is coordinated in terms of dimensions with the driver extension 141. The longitudinal portion 252 is oriented parallel to the direction of longitudinal extent of the second guide rail 16. The same applies with regard to the laying path, formed in the region of the second bend C2, of the cable strand 10 with the path portions V3, V4. The transverse portion 253 is oriented perpendicularly to the longitudinal portion 252. The longitudinal portion 252 and the transverse portion 253 are connected to one another by means of a curvature portion, not denoted specifically.

The second deflecting pulley 18 is arranged at an upper front end 162 of the second guide rail 16 and is fastened rotatably to same by means of an axle element 181 which engages in an axle receptacle 163 of the second guide rail 16.

For the coupling of the second coupling device 12, the second driver element 14 moves from the bottom upward along the third path portion V3 and enters the inlet portion 251, moves along the longitudinal portion 252 and, on passing through the second bend C2, is moved into the transverse portion 253. After passing through the second bend C2, the second driver element 14 moves from the top downwards along the fourth path portion V4, wherein the driver extension 141 is held in a form-fitting manner in the transverse portion 253 in the longitudinal direction of the second guide rail 16. As a result, the second coupling device 12 is coupled to the cable strand 10 and towed downwards along the second guide rail 16 by action of the second driver element 14. The uncoupling of the second coupling device 12 takes place in a kinematically reverse manner.

The locking unit 26 serves for releasably locking the second coupling device 12 in the upper end position. As a result, after decoupling from the cable strand 10, the window pane 5 can be held reliably in the closed position. The locking unit 26 can be transferred between a locking state and a release state by action of the second driver element 14. In the locking state, the second coupling device 12 is locked to the second guide rail 16. In the release state, said locking is released and the second coupling device 12 can accordingly be shifted in a linearly movable manner along the second guide rail 16.

For the transfer between the locking state and the release state, the locking unit 26 has a locking element 261 which is movable relative thereto. The locking element 261 interacts firstly with the second driver element 14 and secondly—in the locked state—with the front end region 162.

For the interaction with the second driver element 14, the locking element 261 has a control profiling 262. The latter is configured here as a control slot S2 which is open on one side.

For the interaction with the front end region 162, the locking element 261 has a locking profiling 263. In the locked state, the latter interacts in a form-fitting manner with a locking web 164 of the second guide rail 16. The locking web 164 is bent by approximately 90° from the longitudinal extent of the second guide rail and forms an upper closure of the second guide rail 16.

Figure 6:
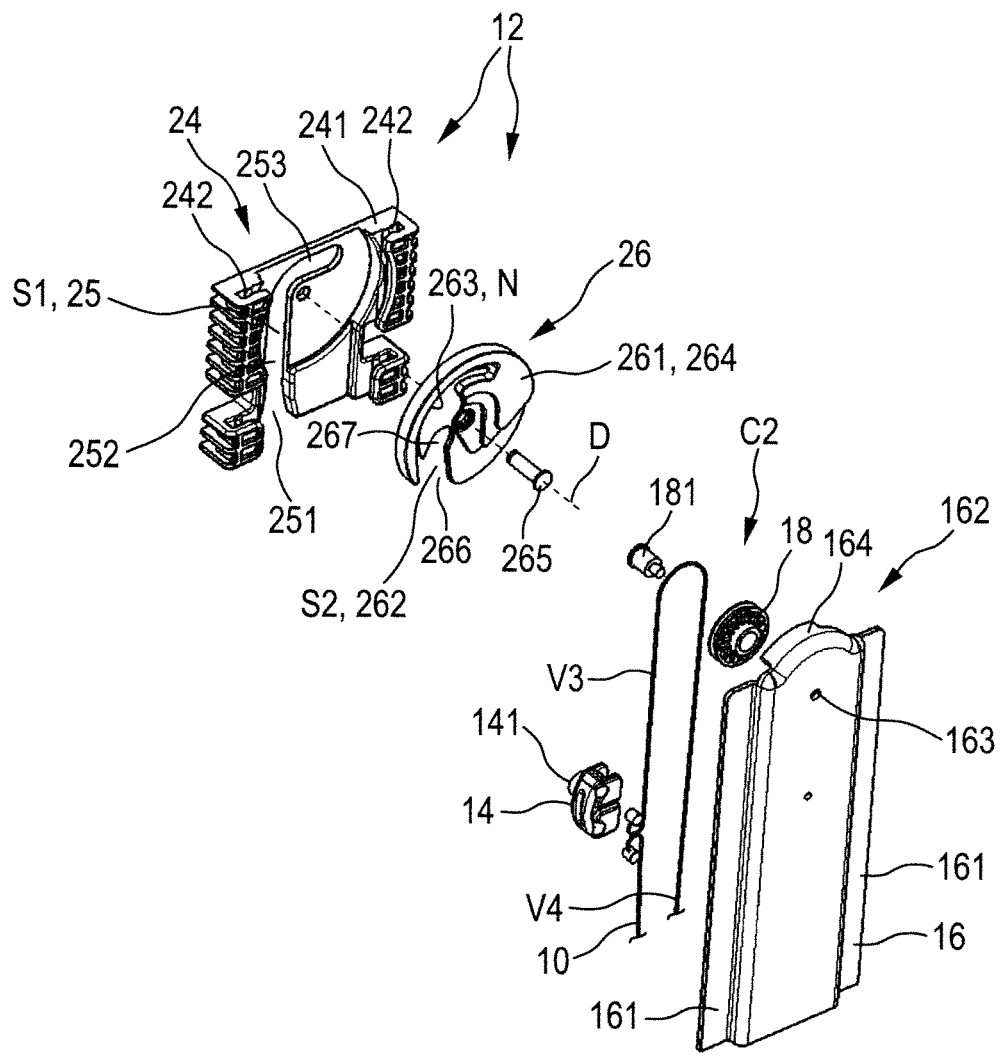
FIG. 6 shows, in a perspective exploded illustration, a detail of the protection device according to FIGS. 1 to 5 in the region of a coupling device assigned to the window pane.

In the embodiment which is shown, the locking element 261 is mounted on the slide unit 24, more precisely: on the slide body 241 thereof, so as to be rotatable about an axis of rotation D, which is shown by dashed lines in FIG. 6. The locking element 261 is configured here as a rotary wheel 264 and has a basic shape substantially in the form of a circular disk. In the ready for operation mounted state, the rotary wheel 264 fits into a receiving recess, not denoted specifically, of the slide body 241, said receiving recess being arranged in the transverse direction between the two guide slots 242. The rotary wheel 264 is fastened to the slide body 241 by means of a wheel axle 265 so as to be rotatable about the axis of rotation D. For this purpose, the wheel axle 265 engages in a receiving bore, not denoted specifically, of the slide body 241.

The control slot S2, which is open on one side, forms a radial notch of the rotary wheel 264 and has an inlet portion 266 and an end portion 267 directly adjoining the inlet portion 266 in the longitudinal direction of the control slot 262. The locking profiling 263 is formed on the edge side of the rotary wheel 264. In the present case, the locking profiling 263 is a radially inwardly open, undercut groove N which is elongate in the circumferential direction of the rotary wheel 264. The groove N extends here over approximately 150°. In the locking state, an edge region of the rotary wheel 264 that is not denoted specifically and is provided with the groove N engages over the front end 162. The locking web 164 engages here in a form-fitting manner in the groove N in the longitudinal direction of the second guide rail 16. The locking web 164 has an elongate curvature here in a manner coordinated with the radius of the groove.

Figure 9:
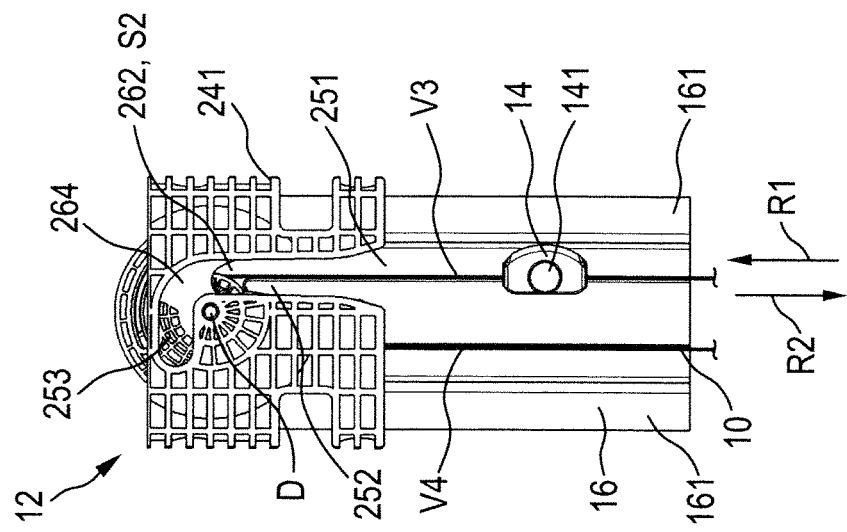
FIGS. 7, 8 and 9 show schematic outer views of the partial region, shown with reference to FIG. 6, of the protection device in different states.
Figure 8:
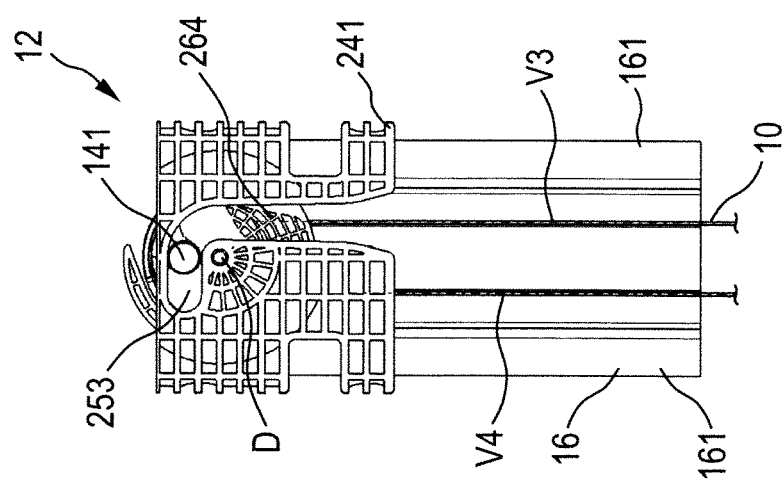
Figure 7:
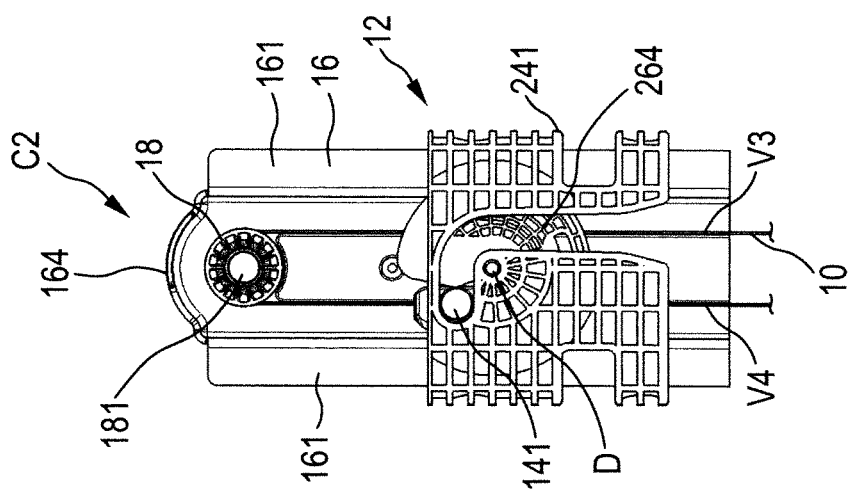
Figure 10:
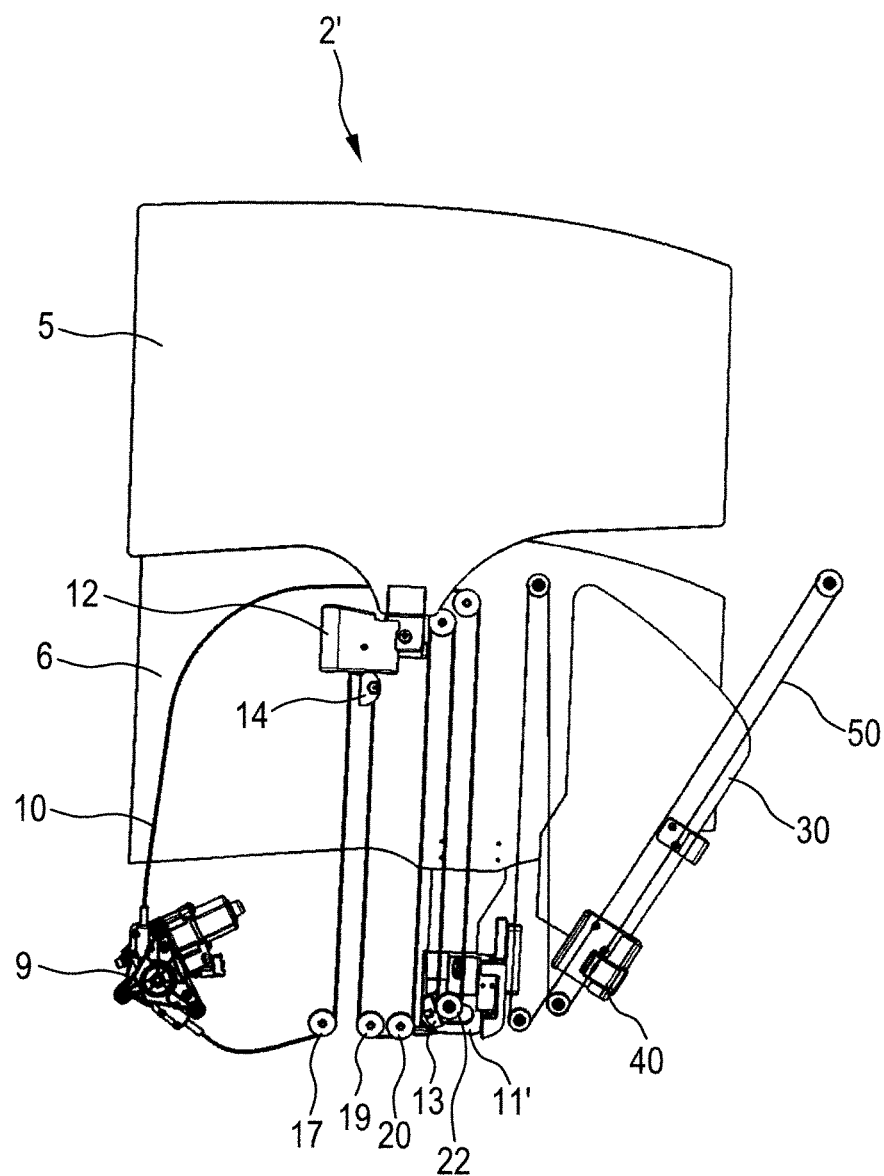
FIG. 10 shows, in an illustration corresponding to FIG. 2, a variant of the protection device according to FIGS. 1 to 9 having a further shading structure.

FIG. 9 shows a decoupled and locked state of the second coupling device 12. In order to release the locking and in order to couple the second coupling device 12, the second driver element 14 is shifted within the third path portion V3 along the first movement direction R1. The slots S1, S2 form a slotted guide arrangement here. The driver extension 141 first of all engages here in the inlet portion 251 of the driver slot S1. After passing through the longitudinal portion 252, the driver extension 141 engages in the control slot S2 of the rotary wheel 264. Through further shifting, the driver extension 141 is moved along the curvature portion of the driver slot S1, as a result of which the rotary wheel 264 is rotated anticlockwise about the axis of rotation D (FIG. 8). The edge region of the rotary wheel 264 unblocks the upper front end 162 in the process. The groove N is disengaged from the locking web 164. After passing through the second bend C2, the driver extension 141 is in the transverse portion 253. A further shifting along the fourth path portion V4 has the effect that the second coupling device 12 is coupled and, by the action of the second driver element 14, is towed downwards along the second guide rail 16. The uncoupling and locking take place in a kinematically reverse manner.

Figure 11:
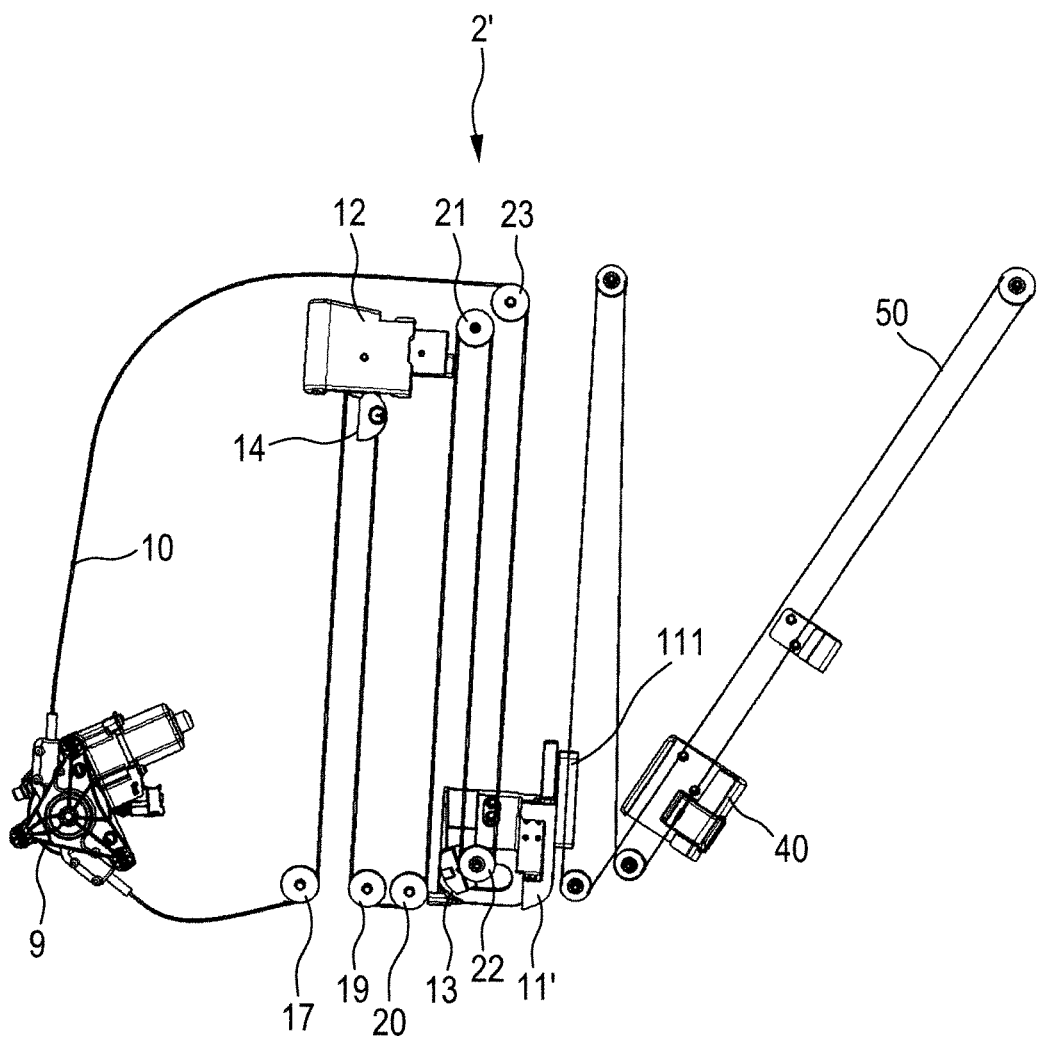
FIG. 11 shows the protection device according to FIG. 10 with the window pane, the shading structure and the further shading structure being omitted from the drawing.
Figure 12:
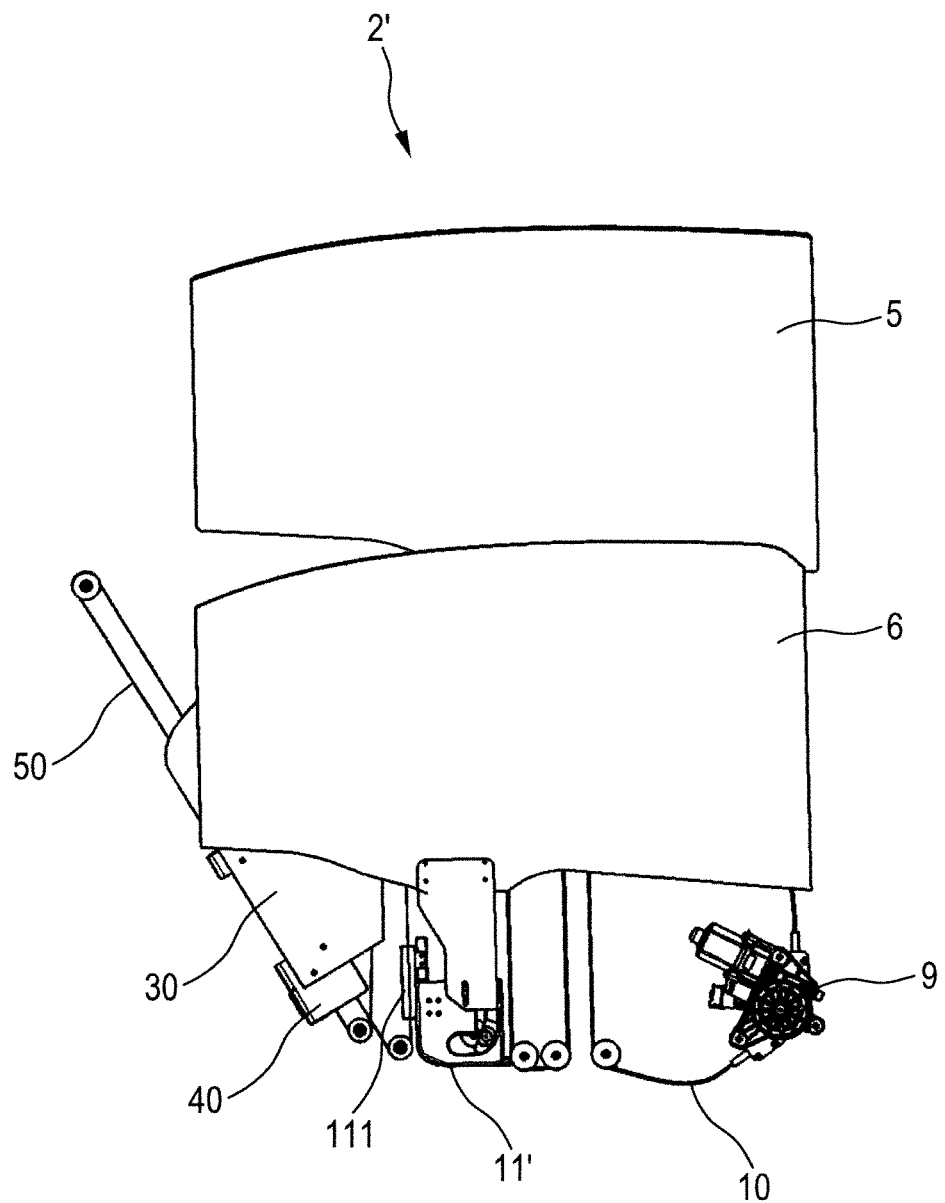
FIG. 12 shows the protection device according to FIGS. 10 and 11 in an illustration corresponding to FIG. 4.
Figure 13:
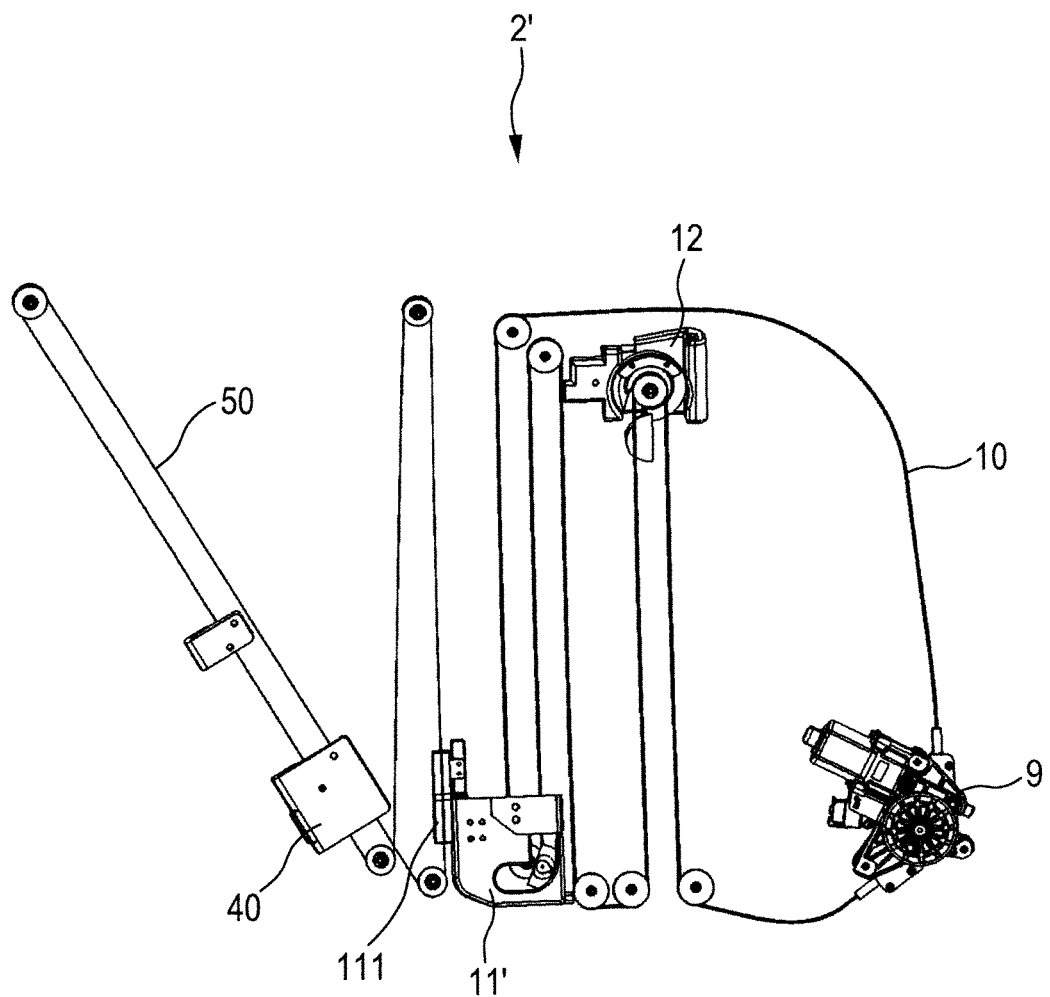
FIG. 13 shows the protection device according to FIGS. 10 to 12 in an inner view corresponding to FIG. 12 and with the window pane, the shading structure and the further shading structure being omitted from the drawing.

With reference to FIGS. 11 to 13, a further embodiment of a protection device 2' is shown which is configured as a variant to the protection device 2 according to FIGS. 1 to 9. The protection device 2' has substantially an identical construction to the protection device 2. Only substantial differences will be discussed below.

In contrast to the protection device 2, the protection device 2' has a further shading structure 30 and a further cable strand 50. The further shading structure 30 is assigned to the secondary opening 4 of the window opening 3, 4 and can be shifted between a corresponding shading position and unblocking position. The further cable strand is connected by means of a connecting device 40 in a force- and movement-transmitting manner to the further shading structure 30. The connecting device 40 is movable with linear guidance on a guide rail, not illustrated specifically in the drawing. In contrast to the cable strand 10, the further cable strand 30 is not directly driven by means of the drive 9. On the contrary, the further cable strand 30 is connected to the first coupling device 11'. By this means, a towed forced movement of the further shading structure 30 is achieved depending on the shifting movement of the shading structure 6. For the connection to the further cable strand 30, the first coupling device 11' has a connecting portion 111. The connection portion 111 is connected in a force- and movement-transmitting manner to the further cable strand 30.

In the configuration apparent with reference to FIGS. 10 to 13, the further shading structure 30 takes up its unblocking position. The connecting device 40 here takes up a lower end position with respect to its shifting direction and the guide rail, not shown specifically. During shifting of the first coupling device 11' from its lower end position in the direction of the upper end position, the connecting device 40 is towed along with forced guidance together with the further shading structure 30 which is connected thereto. The forced movement takes place here in both directions.

Furthermore, the further shading structure 30 is configured in a manner corresponding to the shading structure 6 as a dimensionally stable light screen.

The invention claimed is:

1. A protection device for a window opening of a motor vehicle, comprising:
   a window pane shiftable with linear guidance between a closed position, in which in the closed position the window pane closes the window opening, and an open position, in which in the open position the window opening is open;
   at least one shading structure shiftable with linear guidance between a shading position, in which in the shading position the shading structure shades the window opening, and an unblocking position, in which in the unblocking position the window opening is unblocked by the shading structure;
   a cable drive system configured to drive and cause a shifting movement of the window pane or the shading structure, the cable drive system including a drive and a cable strand, the cable strand being movable by the drive and extending along a path; and
   a mechanical coupling arrangement, the mechanical coupling arrangement being transferable between a first state wherein the shading structure is coupled to the cable strand such that the cable strand drives and shifts in the shading structure and wherein the window pane is decoupled from the cable strand, and a second state wherein the shading structure is decoupled from the cable strand and the window pane is coupled to the cable strand such that the cable strand drives and shifts the window pane.

2. The protection device according to claim 1, further including at least one driver element and first and second guide rail arrangements, the at least one driver element being connected to the cable strand, wherein the mechanical coupling arrangement having a first coupling device connected to the shading structure and a second coupling device connected to the window pane, said first and second coupling devices being respectively guided linearly on the respective first and second guide rail arrangements, wherein in the first state the first coupling device interacts in a force and movement transmitting manner and in a releasable form-fitting manner with the at least one driver element, and in the second state the second coupling device interacts in a force and movement transmitting manner and in a releasable form-fitting manner with the at least one driver element.

3. The protection device according to claim 2, wherein the cable drive system includes first and second deflecting pullies, the path of the cable strand has a first bend formed by the first deflecting pulley and a second bend formed by the second deflecting pulley, wherein the first coupling device is coupled to and decoupled from the at least one driver element in a region of the first bend, and the second coupling device is coupled to and decoupled from the at least one driver element in a region of the second bend.

4. The protection device according to claim 2, wherein the first coupling device and the second coupling device each have a slide unit, the slide unit of the first coupling device being which is guided linearly on the first guide rail arrangement and the slide unit of the second coupling device being guided linearly on the second guide rail arrangement, and each slide unit has a driver profiling configured for releasable form-fitting interaction with the at least one driver element.

5. The protection device according to claim 4, wherein the driver profiling is configured as a driver slot open on one side, the at least one driver element entering the driver slot to couple the corresponding first or second coupling device to the at least one driver element, the at least one driver element being held in a form-fitting manner in the driver slot, the at least one driver element emerging from the at least one driver slot to decouple the corresponding first or second coupling device from the at least one driver element.

6. The protection device according to claim 2, wherein the first coupling device and the second coupling device each have a locking unit, the locking unit being configured to releasably lock the corresponding first or second coupling device to the corresponding first or second guide rail arrangement by controlling action of the at least one driver element.

7. The protection device according to claim 6, wherein each locking unit has a locking element shiftable between a locking state and a release state, the locking unit further including a control profiling, the at least one driver element interacting with the control profiling for shifting the locking element between the locking state and the release state.

8. The protection device according to claim 7, wherein the first and second guide rail arrangements each have a front end, each locking element comprises a rotary wheel mounted on the slide unit of the corresponding first or second coupling device for rotation about an axis of rotation, the rotary wheel having a locking profiling configured to interact in a releasable form-fitting manner with the front end of the corresponding first or second guide rail arrangement.

9. The protection device according to claim 7, wherein the control profiling is configured as a control slot, the control slot opening on one side of the locking element, the control profiling and a driver profiling being arranged in an at least partial overlapping manner with one another and forming a slotted guide arrangement for controlling movement of the locking element.

10. The protection device according to claim 2, wherein the window opening is a first window opening and the vehicle has a second window opening adjacent the first window opening, the protection device comprising at least one additional shading structure and the cable drive system comprises an additional cable strand, the at least one additional shading structure being connected to the additional cable strand of the cable drive system, the at least one additional shading structure being configured to shade the second window opening, and the additional cable strand is connected to the first coupling device such that the at least one additional shading structure undergoes a towed movement during shifting movement of the at least one shading structure.

11. The protection device according to claim 1, wherein the shading structure comprises a screen, the screen being less light-permeable than the window pane.

12. The protection device according to claim 11, wherein the screen is completely light-permeable.

13. The protection device according to claim 1, wherein the protection device further includes a guide rail arrangement and the cable drive system includes a driver element, the mechanical coupling arrangement comprises at least one coupling device, the at least one coupling device having a slide unit configured for slidable linear guidance on the guide rail arrangement and having a driver profiling configured for form-fitting engagement with the driver element of the cable drive system, the mechanical coupling unit further including with a locking unit, the locking unit controlling movement of the driver element to lock the at least one coupling device in a form-fitting engagement with the guide rail arrangement.

14. A motor vehicle door comprising a protection device according to claim 1.

\* \* \* \* \*